United States Patent
Ye

(10) Patent No.: US 12,118,163 B2
(45) Date of Patent: Oct. 15, 2024

(54) DISPLAY PANEL AND DISPLAY DEVICE

(71) Applicant: Wuhan China Star Optoelectronics Semiconductor Display Technology Co., Ltd., Hubei (CN)

(72) Inventor: Jian Ye, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/773,056

(22) PCT Filed: Mar. 17, 2022

(86) PCT No.: PCT/CN2022/081311
§ 371 (c)(1),
(2) Date: Apr. 29, 2022

(87) PCT Pub. No.: WO2023/164979
PCT Pub. Date: Sep. 7, 2023

(65) Prior Publication Data
US 2024/0168585 A1    May 23, 2024

(30) Foreign Application Priority Data
Mar. 2, 2022   (CN) .......................... 202210198784.8

(51) Int. Cl.
*G06F 3/041* (2006.01)
(52) U.S. Cl.
CPC .......... *G06F 3/0418* (2013.01); *G06F 3/0412* (2013.01); *G06F 2203/04102* (2013.01)

(58) Field of Classification Search
CPC ......... G06F 3/04164; G06F 3/041–047; G06F 2203/041–04114; G06F 3/0445;
(Continued)

(56) References Cited

U.S. PATENT DOCUMENTS

2020/0110497 A1* 4/2020 Jin ........................ G06F 3/0446
2021/0376037 A1* 12/2021 You ..................... H10K 59/1315

FOREIGN PATENT DOCUMENTS

| CN | 102541334 | 7/2012 |
| CN | 110703526 | 1/2020 |

(Continued)

OTHER PUBLICATIONS

International Search Report and the Written Opinion Dated Oct. 10, 2022 From the International Searching Authority Re. Application No. PCT/CN2022/081311 and Its Translation Into English. (20 Pages).

(Continued)

*Primary Examiner* — Sanjiv D. Patel

(57) ABSTRACT

The present application provides a display panel and a display device. The display panel includes a display area and a fan-out area. The display panel further includes a substrate, a display layer including a common electrode trace, and a touch layer including a peripheral touch trace. In the fan-out area, a projection of the common electrode trace on the substrate and a projection of the peripheral touch trace on the substrate are at least partially overlapped, and at least three insulation film layers are provided between the common electrode trace and the peripheral touch trace in at least an area where their projections are overlapped.

16 Claims, 4 Drawing Sheets

(58) Field of Classification Search
CPC .. G06F 3/0412; H10K 59/40; H10K 59/1275; H10K 59/131; H10K 50/841; H10K 50/814; H10K 50/844; G02F 1/133345; G02F 2201/121; G02F 1/13338; G02F 1/1343

See application file for complete search history.

(56) References Cited

FOREIGN PATENT DOCUMENTS

| | | |
|---|---|---|
| CN | 110908199 | 3/2020 |
| CN | 112582438 | 3/2021 |
| CN | 212725311 | 3/2021 |
| CN | 112802874 | 5/2021 |
| CN | 112947794 | 6/2021 |
| CN | 113157140 | 7/2021 |
| CN | 113821121 | 12/2021 |
| JP | 2018-112690 | 7/2018 |
| KR | 10-2019-0072940 | 6/2019 |

OTHER PUBLICATIONS

Notification of Office Action and Search Report Dated Apr. 30, 2023 From the State Intellectual Property Office of the People's Republic of China Re. Application No. 202210198784.8 and Its Translation Into English. (14 Pages).

\* cited by examiner

DISPLAY PANEL AND DISPLAY DEVICE

RELATED APPLICATIONS

This application is a National Phase of PCT Patent Application No. PCT/CN2022/081311 having International filing date of Mar. 17, 2022, which claims the benefit of priority of Chinese Patent Application No. 202210198784.8 filed on Mar. 2, 2022. The contents of the above applications are all incorporated by reference as if fully set forth herein in their entirety.

FIELD AND BACKGROUND OF THE INVENTION

The present application relates to a display field, and in particular, to a display panel and a display device.

For a conventional active-matrix organic light-emitting diode (AMOLED) on-cell touch display screen, a touch electrode is formed on an upper surface of an encapsulation layer above a display layer. A peripheral touch trace connecting the touch electrode generally extends downwardly from both sides of a panel to a binding area at a lower edge.

In order to reduce an impedance of the peripheral touch trace, the peripheral touch trace adopts a double-layer trace arrangement, i.e., is generally formed of a first metal trace and a second metal trace. The first metal trace and the second metal trace are separated by an insulation layer, and the first metal trace and the second metal trace are connected through a via at intervals in an extending direction of the peripheral touch trace. At the same time, in order to reduce interference of the display signal trace in the display panel on the touch signal, the peripheral touch trace is disposed above the common electrode trace and at a lower boundary of the display panel.

However, a situation where a pixel definition layer and an interlayer insulation layer exist merely between the peripheral touch trace and the common electrode trace results in a large parasitic capacitance between the peripheral touch trace and the common electrode trace, thus, affecting the touch performance of the display panel.

A display panel and a display device are provided to reduce parasitic capacitance between a peripheral touch trace and a common electrode trace, and improve the touch performance of the display panel.

SUMMARY OF THE INVENTION

The present application provides a display panel including a display area and a fan-out area, wherein the fan-out area comprises a bending area, a first non-display area on a side of the bending area away from the display area, and a second non-display area on a side of the bending area close to the display area, wherein the display panel comprises:
  a substrate;
  a display layer disposed on a side of the substrate and comprising a common electrode trace; and
  a touch layer disposed on a side of the display layer away from the substrate and comprising a peripheral touch trace;
  wherein in the first non-display area, a projection of the common electrode trace on the substrate and a projection of the peripheral touch trace on the substrate are at least partially overlapped, and at least three insulation film layers are provided between the common electrode trace and the peripheral touch trace in at least an area where their projections are overlapped.

Optionally, in some embodiments of the display panel of the present application, the three insulation film layers comprise at least one inorganic insulation film layer and at least one organic insulation film layer.

Optionally, in some embodiments of the display panel of the present application, the touch layer comprises a first metal layer, a second metal layer, a first touch insulation layer, and a second touch insulation layer; wherein the first touch insulation layer is disposed between the display layer and the first metal layer, the first metal layer is disposed between the first touch insulation layer and the second touch insulation layer, and the second touch insulation layer is disposed between the first metal layer and the second metal layer; wherein the display layer further comprises a planarization layer disposed between the common electrode trace and the touch layer; wherein the peripheral touch trace having an overlapped projection with the common electrode trace is pattern-formed from the second metal layer; wherein the first touch insulation layer, the second touch insulation layer, and the planarization layer are provided between the common electrode trace and the peripheral touch trace in at least an area where their projections are overlapped.

Optionally, in some embodiments of the display panel of the present application, the peripheral touch trace in the second non-display area is pattern-formed from the second metal layer.

Optionally, in some embodiments of the display panel of the present application, the display panel further comprises a touch connection line, the touch connection line extends through the bending area to the first non-display area and the second non-display area, and the touch connection line is connected to peripheral touch trace in the first non-display area and the second non-display area.

Optionally, in some embodiments of the display panel of the present application, the touch layer comprises a first touch insulation layer, and the first touch layer is disposed between the common electrode trace and the display layer; wherein the display layer comprises a third metal layer, a fourth metal layer, an interlayer insulation layer, and the planarization layer; wherein the third metal layer is disposed between the substrate and the interlayer insulation layer, the fourth metal layer is disposed between the interlayer insulation layer and the planarization layer, and the planarization layer is disposed between the fourth metal layer and the touch layer; wherein the common electrode trace having an overlapped projection with the peripheral touch trace is pattern-formed from the third metal layer, and the first touch insulation layer, the interlayer insulation layer, and the planarization layer are provided between the common electrode trace and the peripheral touch trace in at least an area where their projections are overlapped.

Optionally, in some embodiments of the display panel of the present application, the third metal layer is a first source/drain layer and the fourth metal layer is a second source/drain layer, or the third metal layer is a gate layer and the fourth metal layer is a source/drain layer.

Optionally, in some embodiments of the display panel of the present application, the display layer further comprises a pixel definition layer, and the pixel definition layer is further disposed between the common electrode trace and the peripheral touch trace in at least an area where their projections are overlapped.

Optionally, in some embodiments of the display panel of the present application, a distance between the common electrode trace and the peripheral touch trace in at least an area where their projections are overlapped ranges from 1 μm to 5 μm.

Optionally, in some embodiments of the display panel of the present application, the touch layer comprises a first metal layer, a second metal layer, and a second touch insulation layer disposed between the first metal layer and the second metal layer; wherein in a non-display area outside the fan-out area, the peripheral touch trace is a two-layer trace, comprising a first peripheral touch trace and a second peripheral touch trace; wherein the first peripheral touch trace is pattern-formed from the first metal layer, the second peripheral touch trace is pattern-formed from the second metal layer, and the first peripheral touch trace and the second peripheral touch trace are connected at intervals by a via hole penetrating through the first touch insulation layer.

The present application further provides a display device including a display panel, wherein the display panel comprises a display area and a fan-out area; the fan-out area comprises a bending area, a first non-display area on a side of the bending area away from the display area, and a second non-display area on a side of the bending area close to the display area; and the display panel comprises:
  a substrate;
  a display layer disposed on a side of the substrate and comprising a common electrode trace; and
  a touch layer disposed on a side of the display layer away from the substrate and comprising a peripheral touch trace;
  wherein in the first non-display area, a projection of the common electrode trace on the substrate and a projection of the peripheral touch trace on the substrate are at least partially overlapped, and at least three insulation film layers are provided between the common electrode trace and the peripheral touch trace in at least an area where their projections are overlapped.

Optionally, in some embodiments of the display device of the present application, the three insulation film layers comprise at least one inorganic insulation film layer and at least one organic insulation film layer.

Optionally, in some embodiments of the display device of the present application, the touch layer comprises a first metal layer, a second metal layer, a first touch insulation layer, and a second touch insulation layer; wherein the first touch insulation layer is disposed between the display layer and the first metal layer, the first metal layer is disposed between the first touch insulation layer and the second touch insulation layer, and the second touch insulation layer is disposed between the first metal layer and the second metal layer; wherein the display layer further comprises a planarization layer disposed between the common electrode trace and the touch layer; wherein the peripheral touch trace having an overlapped projection with the common electrode trace is pattern-formed from the second metal layer; wherein the first touch insulation layer, the second touch insulation layer, and the planarization layer are provided between the common electrode trace and the peripheral touch trace in at least an area where their projections are overlapped.

Optionally, in some embodiments of the display device of the present application, the peripheral touch trace in the second non-display area is pattern-formed from the second metal layer.

Optionally, in some embodiments of the display device of the present application, the display panel further comprises a touch connection line, the touch connection line extends through the bending area to the first non-display area and the second non-display area, and the touch connection line is connected to peripheral touch trace in the first non-display area and the second non-display area.

Optionally, in some embodiments of the display device of the present application, the touch layer comprises a first touch insulation layer, and the first touch layer is disposed between the common electrode trace and the display layer; wherein the display layer comprises a third metal layer, a fourth metal layer, an interlayer insulation layer, and the planarization layer; wherein the third metal layer is disposed between the substrate and the interlayer insulation layer, the fourth metal layer is disposed between the interlayer insulation layer and the planarization layer, and the planarization layer is disposed between the fourth metal layer and the touch layer; wherein the common electrode trace having an overlapped projection with the peripheral touch trace is pattern-formed from the third metal layer, and the first touch insulation layer, the interlayer insulation layer, and the planarization layer are provided between the common electrode trace and the peripheral touch trace in at least an area where their projections are overlapped.

Optionally, in some embodiments of the display device of the present application, the third metal layer is a first source/drain layer and the fourth metal layer is a second source/drain layer, or the third metal layer is a gate layer and the fourth metal layer is a source/drain layer.

Optionally, in some embodiments of the display device of the present application, the display layer further comprises a pixel definition layer, and the pixel definition layer is further disposed between the common electrode trace and the peripheral touch trace in at least an area where their projections are overlapped.

Optionally, in some embodiments of the display device of the present application, a distance between the common electrode trace and the peripheral touch trace in at least an area where their projections are overlapped ranges from 1 μm to 5 μM.

Optionally, in some embodiments of the display device of the present application, the touch layer comprises a first metal layer, a second metal layer, and a second touch insulation layer disposed between the first metal layer and the second metal layer; wherein in a non-display area outside the fan-out area, the peripheral touch trace is a two-layer trace, comprising a first peripheral touch trace and a second peripheral touch trace; wherein the first peripheral touch trace is pattern-formed from the first metal layer, the second peripheral touch trace is pattern-formed from the second metal layer, and the first peripheral touch trace and the second peripheral touch trace are connected at intervals by a via hole penetrating through the first touch insulation layer.

The present application provides a display panel and a display device, wherein the display panel includes a display area and a fan-out area. The fan-out area includes a bending area, a first non-display area on a side of the bending area away from the display area, and a second non-display area on a side of the bending area close to the display area. The display panel includes a substrate; a display layer disposed on a side of the substrate and comprising a common electrode trace; and a touch layer disposed on a side of the display layer away from the substrate and comprising a peripheral touch trace; wherein in the first non-display area, a projection of the common electrode trace on the substrate and a projection of the peripheral touch trace on the substrate are at least partially overlapped, and at least three insulation film layers are provided between the common electrode trace and the peripheral touch trace in at least area where their projections are overlapped. According to the present application, at least three insulation film layers are provided between the common electrode trace and the peripheral touch trace in at least area where their projections are overlapped, so that a distance between the common electrode trace and the peripheral touch trace is increased. As a result, a parasitic capacitance between the common electrode trace and the peripheral touch trace is reduced, and the touch performance of the display panel is improved.

BRIEF DESCRIPTION OF THE SEVERAL VIEWS OF THE DRAWINGS

The technical solutions and beneficial effects of this application will be apparent from the following detailed description of the embodiments of this application with reference to the accompanying drawings.

DESCRIPTION OF SPECIFIC EMBODIMENTS OF THE INVENTION

The present application provides a display panel, which can reduce parasitic capacitances between a peripheral touch trace and a common electrode trace, and improve touch performance of the display panel.

In an embodiment, the display panel provided by the present application includes a display area AA and a fan-out area FA. The fan-out area FA includes a bending area BA, a first non-display area NA1 on a side of the bending area BA away from the display area AA, and a second non-display area NA2 on a side of the bending area BA close to the display area AA. The display panel includes:

a substrate 10;

a display layer disposed on a side of the substrate 10 and including a common electrode trace 218; and a touch layer disposed on a side of the display layer away from the substrate 10 and including a peripheral touch trace Lx.

In the first non-display area NA1, a projection of the common electrode trace 218 on the substrate and a projection of the peripheral touch trace Lx on the substrate are at least partially overlapped, and at least three insulation film layers are provided between the common electrode trace 218 and the peripheral touch trace Lx in at least an area where their projections are overlapped.

According to an embodiment of the present application, a distance between the common electrode trace and the peripheral touch trace is increased by providing at least three insulation film layers between the common electrode trace and the peripheral touch trace in at least an area where their projections are overlapped, so that a parasitic capacitance between the common electrode trace and the peripheral touch trace is reduced, and the touch performance of the display panel is improved.

In an embodiment, the distance between the common electrode trace 218 and the peripheral touch trace Lx in at least an area where their projections are overlapped ranges from 1 μm to 5 μm.

Figure 1:
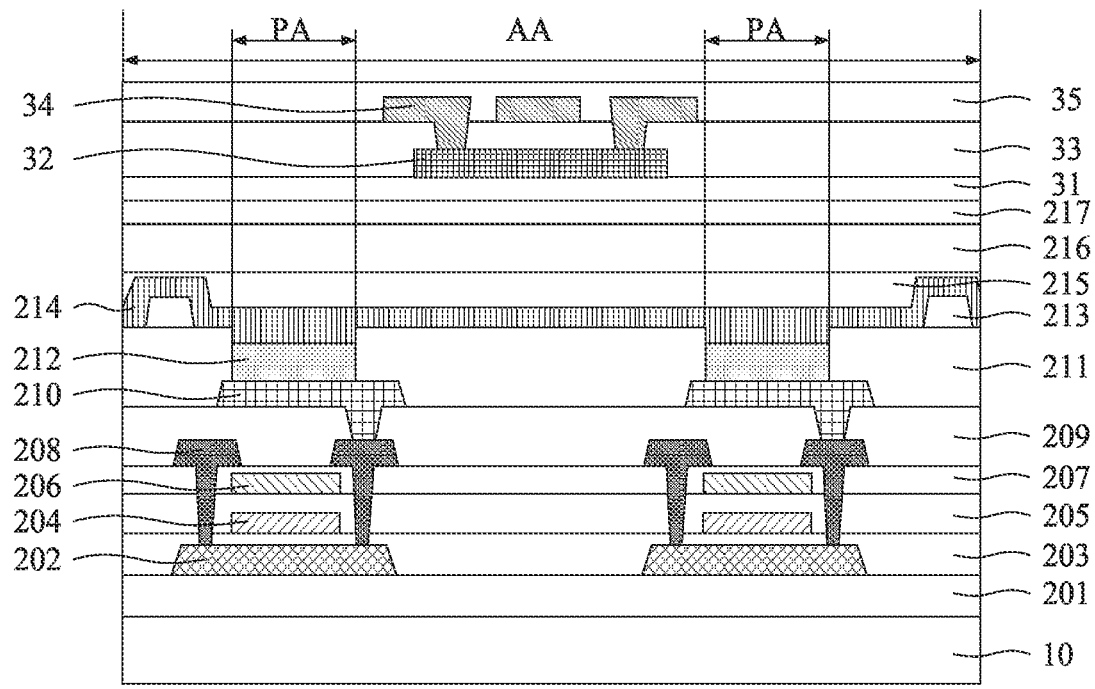
FIG. 1 is a first structural schematic diagram of a display panel according to an embodiment of this application.

Specifically, referring to FIG. 1, FIG. 1 shows a first structural schematic diagram of a display panel according to an embodiment of the present application. That is, FIG. 1 shows a structural schematic diagram of a display area of the display panel. In the display area AA as shown in FIG. 1, the display layer is disposed on the substrate 10, and the display layer includes a buffer layer 201, a semiconductor active layer 202, a first gate insulation layer 203, a first gate layer 204, a second gate insulation layer 205, a second gate layer 206, an interlayer insulation layer 207, a source/drain layer 208, a planarization layer 209, a first electrode layer 210, a pixel definition layer 211, a light-emitting layer 212, a support pillar 213, a second electrode layer 214, a first encapsulation layer 215, a second encapsulation layer 216, and a third encapsulation layer 217 stacked in sequence. The semiconductor active layer 202, the first gate layer 204, the second gate layer 206, the source/drain layer 208 are pattern-formed form a thin film transistor, a capacitor, a signal line, and the like.

The touch layer is disposed on the display layer and is prepared close to a light-emitting surface of the display layer. Referring to FIG. 1, in the display area AA, the touch layer includes a first touch insulation layer 31, a first metal layer 32, a second touch insulation layer 33, a second metal layer 34, and a passivation layer 35. The first metal layer 32 is pattern-formed form a bridge electrode, and the second metal layer 34 is pattern-formed form a touch driving electrode Tx and a touch sensing electrode Rx. The touch driving electrode Tx or the touch sensing electrode Rx is connected to the bridge electrode through a via hole, so that the touch driving electrode Tx or the touch sensing electrode Rx is connected with each other. The touch driving electrode Tx, the touch sensing electrode Rx, and the bridge electrode are disposed in a gap between light-emitting areas PA.

Figure 6:
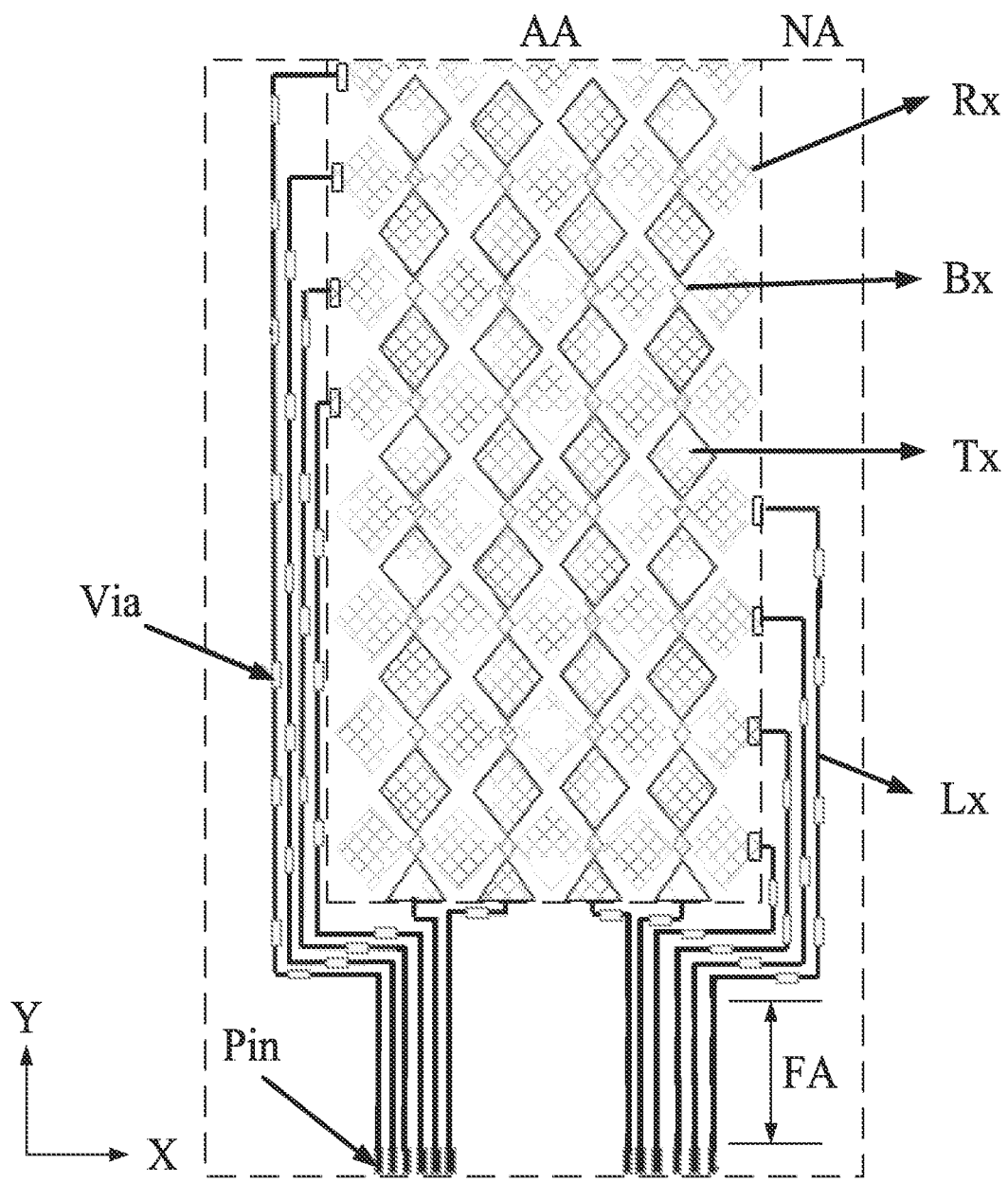
FIG. 6 is a plane structural schematic diagram of a touch layer according to an embodiment of this application.

Referring to FIG. 6, FIG. 6 shows a plane structural schematic diagram of a touch layer according to the present application. The touch layer includes a plurality of touch driving electrodes Tx, a plurality of touch sensing electrodes Rx, and a plurality of peripheral touch trace Lx; wherein the plurality of touch driving electrodes Tx and the plurality of touch sensing electrodes Rx are located in the display area AA, and the peripheral touch trace Lx is located in the non-display area NA. The plurality of touch sensing electrodes Rx are continuously conductive in a X direction, and the plurality of touch driving electrodes Tx are continuously conductive by bridge electrodes Bx in a Y direction. The touch driving electrode Tx and the touch sensing electrode Rx are referred relatively, and may be interchanged. A part of the peripheral touch trace Lx is connected to the touch sensing electrode Rx continuously conductive in the X direction, and extends from the left and right sides of the display area to a binding area of an edge through the fan-out area FA, thereby connecting to a binding terminal Pin. Another part of the peripheral touch trace Lx is connected to the touch driving electrode Tx continuously conductive in the Y direction, and extends to the binding area of the edge through the fan-out area FA, thereby connecting to the binding terminal Pin.

Figure 3:
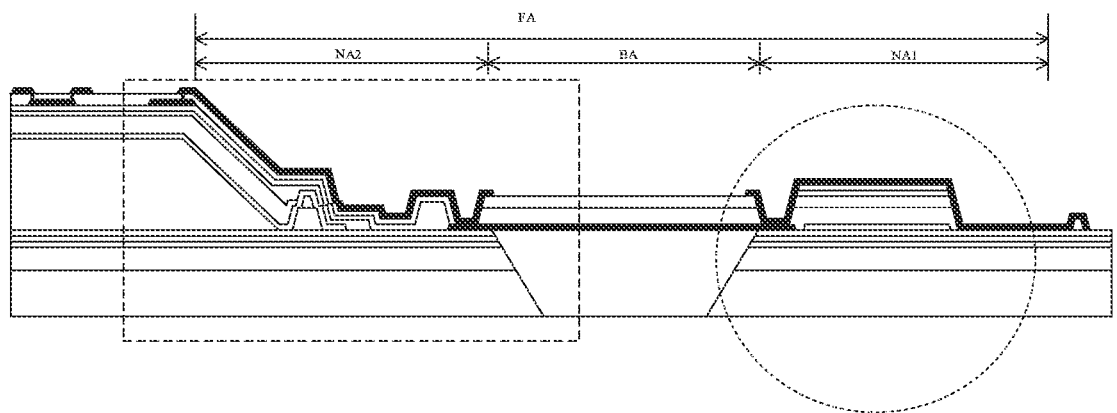
FIG. 3 is a third structural schematic diagram of a display panel according to an embodiment of this application.
Figure 4:
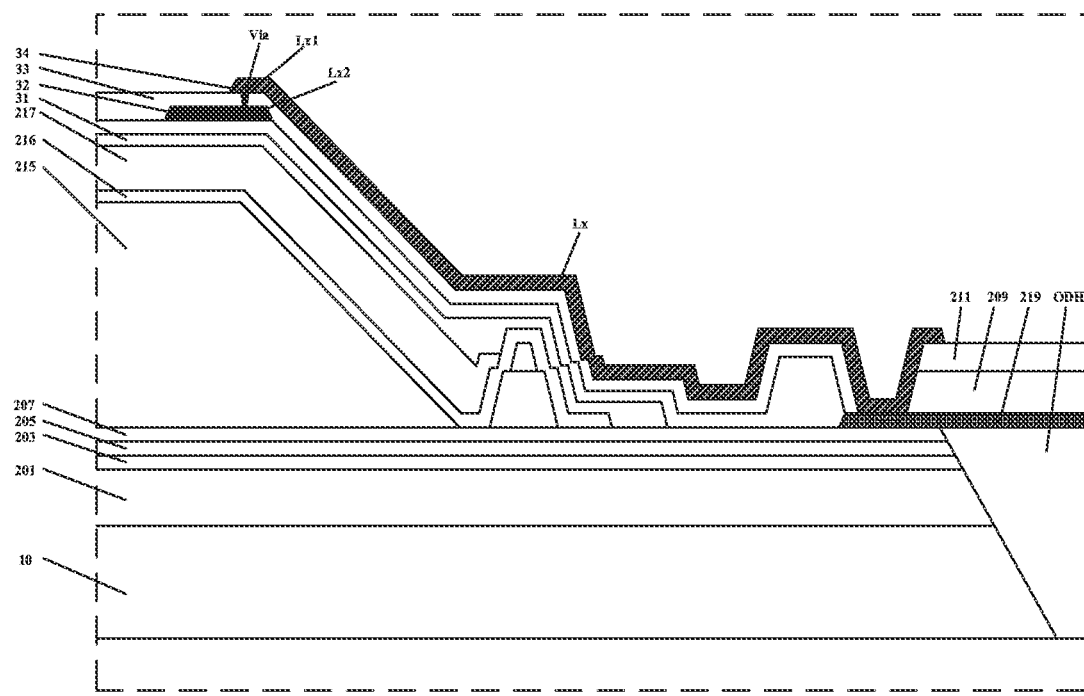
FIG. 4 is a fourth structural schematic diagram of a display panel according to an embodiment of this application.

In an embodiment, as shown in FIG. 3, FIG. 4, and FIG. 6, the peripheral touch trace Lx located in the non-display area NA and outside the fan-out area FA has a two-layer trace. The peripheral touch trace Lx includes a first peripheral touch trace Lx1 and a second peripheral touch trace Lx2. The first peripheral touch trace Lx1 is pattern-formed from the first metal layer 32, and the second peripheral touch trace Lx2 is pattern-formed from the second metal layer 34. The first peripheral touch trace Lx1 and the second peripheral touch trace Lx2 are connected at intervals by a via hole Via, wherein the via hole Via extends through the second touch insulation layer 33. Thus, the two-layer trace is designed for the peripheral touch trace, so that the resistance of the peripheral touch trace is reduced, the impedance of the touch layer is reduced, and the touch effect of the display panel is improved.

Figure 5:
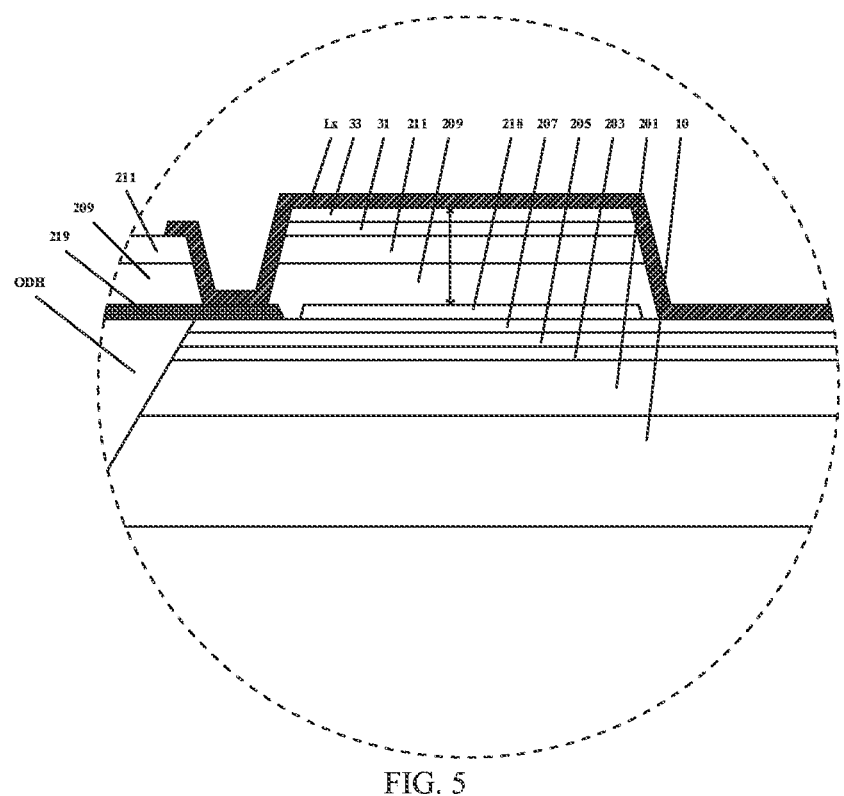
FIG. 5 is a fifth structural schematic diagram of a display panel according to an embodiment of this application.

Referring to FIG. 3 to FIG. 5, FIG. 3 to FIG. 5 show three structural schematic diagrams of a display panel according to an embodiment of the present application, respectively. Specifically, FIG. 3 to FIG. 5 show structural schematic diagrams of a fan-out area of the display panel, wherein FIG. 4 and FIG. 5 are partially enlarged schematic diagrams of FIG. 3.

Referring to FIG. 3, in the bending area BA, the display panel includes an organic layer ODH, a touch connection line 219, and a planarization layer 209. The organic layer ODH extends through the substrate 10, the buffer layer 201, the first gate insulation layer 203, the second gate insulation layer 205, and the interlayer insulation layer 207, so as to improve the bending performance of the bending area BA. The touch connection line 219 is generally formed by patterning the source/drain layer 208. The touch connection line 219 extends through the bending area BA to the first non-display area NA1 and the second non-display area NA2. The touch connection line 219 is connected to the peripheral touch traces located in the first non-display area NA1 and the second non-display area NA2, so as to conduct the peripheral touch traces continuously.

As shown in FIG. 3 and FIG. 4, in the second non-display area NA2, the display panel includes a substrate 10, a buffer layer 201, a first gate insulation layer 203, a second gate insulation layer 205, an interlayer insulation layer 207, a first encapsulation layer 215, a third encapsulation layer 217, a first touch insulation layer 31, a second touch insulation layer 33, and a peripheral touch trace Lx. The peripheral touch trace Lx is connected to the touch connection line 219 through a via hole, wherein the via hole extends through the first touch insulation layer 31 and the second touch insulation layer 33.

As shown in FIG. 3 and FIG. 5, in the first non-display area NA1, the display panel includes a substrate 10, a buffer layer 201, a first gate insulation layer 203, a second gate insulation layer 205, an interlayer insulation layer 207, a common electrode trace 218, a planarization layer 209, a first touch insulation layer 31, and a peripheral touch trace Lx. The peripheral touch trace Lx is connected to the touch connection line 219 through a via hole, wherein the via hole extends through the planarization layer 209 and the first touch insulation layer 31. The projection of the common electrode trace 218 on the substrate 10 and the projection of the peripheral touch trace Lx on the substrate 10 are overlapped. At least three insulation film layers are provided between the common electrode trace 218 and the peripheral touch trace Lx in at least an area where their projections are overlapped. That is, the at least three insulation layers include at least one insulation film layer in addition to the planarization layer 209, and the first touch insulation layer 31.

In a first embodiment, in the first non-display area NA1, the peripheral touch trace Lx is pattern-formed from the second metal layer 34. Thus, at least three insulation film layers including the planarization layer 209, the first touch insulation layer 31, and the second touch insulation layer 33 are provided between the common electrode trace 218 and the peripheral touch trace Lx in the area where their projections are overlapped. Compared with the prior art where only two insulation film layers including the planarization layer and the first touch insulation layer are provided between the common electrode trace 218 and the peripheral touch trace Lx in the area where their projections are overlapped, the display panel of the present application adds at least the second touch insulation layer 33 to dispose between the common electrode trace 218 and the peripheral touch trace Lx, so that the distance between the common electrode trace 218 and the peripheral touch trace Lx is increased. As a result, the parasitic capacitances between the common electrode trace 218 and the peripheral touch trace Lx is reduced, and the touch performance of the display panel is improved.

Further, in the second non-display area NA2, the peripheral touch trace Lx is pattern-formed from the second metal layer 34. Thus, the peripheral touch trace in the fan-out area FA is a single-layer trace, which simplifies a preparing process of the peripheral touch trace in the fan-out area FA, and reduces the difficulty in preparing the touch layer due to the uneven surface of the display layer in the fan-out area FA.

Figure 2:
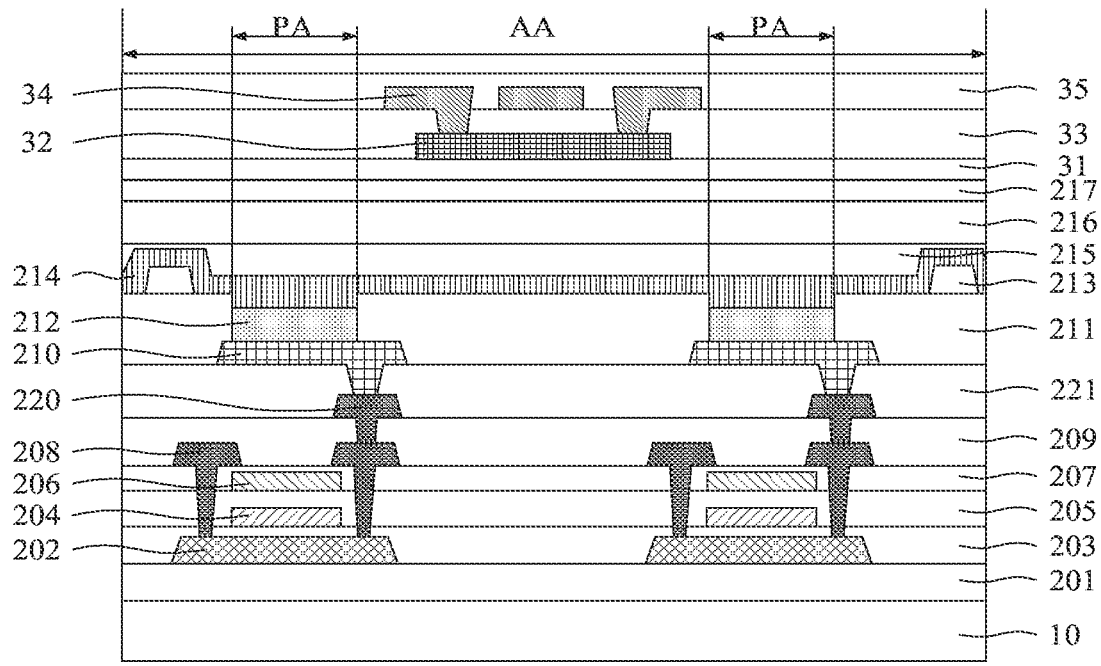
FIG. 2 is a second structural schematic diagram of a display panel according to an embodiment of this application.

In a second embodiment, referring to FIG. 2, FIG. 2 is a second structural schematic diagram of a display area of a display panel according to an embodiment of the present application. As shown in FIG. 2, the display layer includes a first source/drain layer 208 and a second source/drain layer 220, wherein the first source/drain layer 208 and the second source/drain layer 220 are separated by a source/drain insulation layer 221 and electrically connected through a via. In the first non-display area NA1, the common electrode trace 218 is pattern-formed from the first source/drain layer 208. Thus, at least three insulation film layers including the source/drain insulation layer 221, the planarization layer 209, and the first touch insulation layer 31 are provided between the common electrode trace 218 and the peripheral touch trace Lx in the area where their projections are overlapped. Compared with the prior art, the display panel of the present application adds at least the source/drain insulation layer 221, so that the distance between the common electrode trace 218 and the peripheral touch trace Lx is increased. As a result, the parasitic capacitance between the common electrode trace 218 and the peripheral touch trace Lx is reduced, and the touch performance of the display panel is improved.

Similarly, the common electrode trace 218 in the first non-display area NA1 having an overlapped projection with the peripheral touch trace Lx may be pattern-formed from a metal layer of the source/drain layer 208 close to the substrate. Compared with the prior art, the display panel of the present application adds at least one insulation film layer between the common electrode trace 218 and the peripheral touch trace Lx in at least an area where their projections are overlapped, so that the distance between the common electrode trace 218 and the peripheral touch trace Lx is also increased. As a result, the parasitic capacitance between the common electrode trace 218 and the peripheral touch trace Lx is reduced, and the touch performance of the display panel is improved.

In a third embodiment, in the first non-display area NA1, the display layer further includes another insulation film layers. For example, the display layer further includes one or more pixel definition layers 211, a support pillar 213, a first encapsulation layer 215, a second encapsulation layer 216, and the third encapsulation layer 217. Thus, compared with the prior art, the display panel of the present application adds at least one insulation film layer between the common electrode trace 218 and the peripheral touch trace Lx in the area where their projections are overlapped, so that the distance between the common electrode trace 218 and the peripheral touch trace Lx is also increased. As a result, the parasitic capacitance between the common electrode trace 218 and the peripheral touch trace Lx is reduced, and the touch performance of the display panel is improved.

The above three embodiments are not conflicting, and may be combined with each other to further reduce parasitic capacitance between the common electrode trace 218 and the peripheral touch trace Lx, thereby improving the touch performance of the display panel. Details of the combination are not described herein.

In conclusion, according to the display panel provided in the embodiments of the present application, at least three insulation film layers are provided between the common electrode trace and the peripheral touch trace in the area where their projections are overlapped, so that the distance between the common electrode trace and the peripheral touch trace is increased. As a result, the parasitic capacitance between the common electrode trace and the peripheral touch trace is reduced, and the touch performance of the display panel is improved.

Meanwhile, a display device is provided in the embodiments of the present application, wherein the display device includes a display panel provided in any embodiment of the present application. Therefore, the display device provided in the embodiments of the present application has the technical features and beneficial effects of the display panel provided in any embodiment of the present application. For details, refer to the above embodiments, which are not described herein again.

The display panel and display device provided in the embodiments of the present application are described in detail above, and the principles and embodiments of the present application are described herein by using specific examples. The description of the embodiments is merely intended to help understand the method and core ideas of the present application. At the same time, a person skilled in the art may make changes in the specific embodiments and application scope according to the idea of the present application. In conclusion, the content of the specification should not be construed as a limitation to the present application.

What is claimed is:

1. A display panel, comprising a display area and a fan-out area, wherein the fan-out area comprises a bending area, a first non-display area on a side of the bending area away from the display area, and a second non-display area on a side of the bending area close to the display area, wherein the display panel comprises:
    a substrate;
    a display layer disposed on a side of the substrate and comprising a common electrode trace; and
    a touch layer disposed on a side of the display layer away from the substrate and comprising a peripheral touch trace;
    wherein in the first non-display area, a projection of the common electrode trace on the substrate and a projection of the peripheral touch trace on the substrate are at least partially overlapped, and at least three insulation film layers are provided between the common electrode trace and the peripheral touch trace in at least an area where their projections are overlapped;
    wherein the three insulation film layers comprise at least one inorganic insulation film layer and at least one organic insulation film layer;
    wherein the touch layer comprises a first metal layer, a second metal layer, a first touch insulation layer, and a second touch insulation layer; wherein the first touch insulation layer is disposed between the display layer and the first metal layer, the first metal layer is disposed between the first touch insulation layer and the second touch insulation layer, and the second touch insulation layer is disposed between the first metal layer and the second metal layer; wherein the display layer further comprises a planarization layer disposed between the common electrode trace and the touch layer; wherein the peripheral touch trace having an overlapped projection with the common electrode trace is pattern-formed from the second metal layer; wherein the first touch insulation layer, the second touch insulation layer, and the planarization layer are provided between the common electrode trace and the peripheral touch trace in at least an area where their projections are overlapped.

2. The display panel of claim 1, wherein the peripheral touch trace in the second non-display area is pattern-formed from the second metal layer.

3. The display panel of claim 2, wherein the display panel further comprises a touch connection line, the touch connection line extends through the bending area to the first non-display area and the second non-display area, and the touch connection line is connected to peripheral touch trace in the first non-display area and the second non-display area.

4. The display panel of claim 1, wherein the display layer comprises a third metal layer, a fourth metal layer, and an interlayer insulation layer; wherein the third metal layer is disposed between the substrate and the interlayer insulation layer, the fourth metal layer is disposed between the interlayer insulation layer and the planarization layer, and the planarization layer is disposed between the fourth metal layer and the touch layer; wherein the common electrode trace having an overlapped projection with the peripheral touch trace is pattern-formed from the third metal layer, and the interlayer insulation layer, is provided between the common electrode trace and the peripheral touch trace in at least an area where their projections are overlapped.

5. The display panel of claim 4, wherein the third metal layer is a first source/drain layer and the fourth metal layer is a second source/drain layer, or the third metal layer is a gate layer and the fourth metal layer is a source/drain layer.

6. The display panel of claim 1, wherein the display layer further comprises a pixel definition layer, and the pixel definition layer is further disposed between the common electrode trace and the peripheral touch trace in at least an area where their projections are overlapped.

7. The display panel of claim 1, wherein a distance between the common electrode trace and the peripheral touch trace in at least an area where their projections are overlapped ranges from 1 μm to 5 μm.

8. The display panel of claim 1, wherein in a non-display area outside the fan-out area, the peripheral touch trace is a two-layer trace, comprising a first peripheral touch trace and a second peripheral touch trace; wherein the first peripheral touch trace is pattern-formed from the first metal layer, the second peripheral touch trace is pattern-formed from the second metal layer, and the first peripheral touch trace and the second peripheral touch trace are connected at intervals by a via hole penetrating through the second touch insulation layer.

9. A display device, comprising a display panel, wherein the display panel comprises a display area and a fan-out area; the fan-out area comprises a bending area, a first non-display area on a side of the bending area away from the display area, and a second non-display area on a side of the bending area close to the display area; and the display panel comprises:
  a substrate;
  a display layer disposed on a side of the substrate and comprising a common electrode trace; and
  a touch layer disposed on a side of the display layer away from the substrate and comprising a peripheral touch trace;
  wherein in the first non-display area, a projection of the common electrode trace on the substrate and a projection of the peripheral touch trace on the substrate are at least partially overlapped, and at least three insulation film layers are provided between the common electrode trace and the peripheral touch trace in at least an area where their projections are overlapped;
  wherein the three insulation film layers comprise at least one inorganic insulation film layer and at least one organic insulation film layer;
  wherein the touch layer comprises a first touch insulation layer, and the first touch layer is disposed between the common electrode trace and the display layer; wherein the display layer comprises a third metal layer, a fourth metal layer, an interlayer insulation layer, and the planarization layer; wherein the third metal layer is disposed between the substrate and the interlayer insulation layer, the fourth metal layer is disposed between the interlayer insulation layer and the planarization layer, and the planarization layer is disposed between the fourth metal layer and the touch layer; wherein the common electrode trace having an overlapped projection with the peripheral touch trace is pattern-formed from the third metal layer, and the first touch insulation layer, the interlayer insulation layer, and the planarization layer are provided between the common electrode trace and the peripheral touch trace in at least an area where their projections are overlapped.

10. The display device of claim 9, wherein the touch layer comprises a first metal layer, a second metal layer, and a second touch insulation layer; wherein, the first metal layer is disposed between the first touch insulation layer and the second touch insulation layer, and the second touch insulation layer is disposed between the first metal layer and the second metal layer; wherein the planarization layer is disposed between the common electrode trace and the touch layer; wherein the peripheral touch trace having an overlapped projection with the common electrode trace is pattern-formed from the second metal layer; wherein the second touch insulation layer is provided between the common electrode trace and the peripheral touch trace in at least an area where their projections are overlapped.

11. The display device of claim 10, wherein the peripheral touch trace in the second non-display area is pattern-formed from the second metal layer.

12. The display device of claim 11, wherein the display panel further comprises a touch connection line, the touch connection line extends through the bending area to the first non-display area and the second non-display area, and the touch connection line is connected to peripheral touch trace in the first non-display area and the second non-display area.

13. The display device of claim 9, wherein the third metal layer is a first source/drain layer and the fourth metal layer is a second source/drain layer, or the third metal layer is a gate layer and the fourth metal layer is a source/drain layer.

14. The display device of claim 10, wherein the display layer further comprises a pixel definition layer, and the pixel definition layer is further disposed between the common electrode trace and the peripheral touch trace in at least an area where their projections are overlapped.

15. The display device of claim 9, wherein a distance between the common electrode trace and the peripheral touch trace in at least an area where their projections are overlapped ranges from 1 μm to 5 μm.

16. The display device of claim 9, wherein the touch layer comprises a first metal layer, a second metal layer, and a second touch insulation layer disposed between the first metal layer and the second metal layer; wherein in a non-display area outside the fan-out area, the peripheral touch trace is a two-layer trace, comprising a first peripheral touch trace and a second peripheral touch trace; wherein the first peripheral touch trace is pattern-formed from the first metal layer, the second peripheral touch trace is pattern-formed from the second metal layer, and the first peripheral touch trace and the second peripheral touch trace are connected at intervals by a via hole penetrating through the first second touch insulation layer.

* * * * *